United States Patent [19]

Fahlen et al.

[11] 4,090,226
[45] May 16, 1978

[54] RELAY PROTECTION FOR CAPACITOR BANKS

[75] Inventors: Nils Torsten Fahlen; Jan Samuelsson; Sture Ragnar Torseng, all of Vasteras, Sweden

[73] Assignee: ASEA AB, Vasteras, Sweden

[21] Appl. No.: 732,981

[22] Filed: Oct. 15, 1976

[30] Foreign Application Priority Data

Jan. 27, 1976 Sweden .......................... 7600810

[51] Int. Cl.² .............................................. H02H 7/16
[52] U.S. Cl. ........................................ 361/16; 361/89
[58] Field of Search .................... 361/15, 16, 17, 191, 361/160, 186, 187, 89, 86; 324/51; 340/248 R, 248 E, 253 R, 253 E, 253 P

[56] References Cited

U.S. PATENT DOCUMENTS

| 2,928,995 | 3/1960 | Hjertberg ........................... 361/16 |
| 3,562,586 | 2/1971 | Carter et al. ........................ 361/16 |
| 3,755,711 | 8/1973 | Fendt ................................... 361/17 |

Primary Examiner—Patrick R. Salce
Attorney, Agent, or Firm—Watson, Cole, Grindle & Watson

[57] ABSTRACT

A capacitor bank is provided with a relay protection device having a number of measuring stations for sensing a number of different disturbances associated with the capacitor bank. Each respective primary winding of a number of auxiliary transformers is connected to a respective measuring station. The auxiliary transformers generate signals at the respective secondary windings thereof with each signal having a respective duration and level output for identifying a respective one of the different disturbances. An electrically insulated current transformer transmits output signals representative of the auxiliary transformer signals to a number of sensing relays each having a respective tripping time and signal level response such that the particular disturbance can be identified.

7 Claims, 4 Drawing Figures

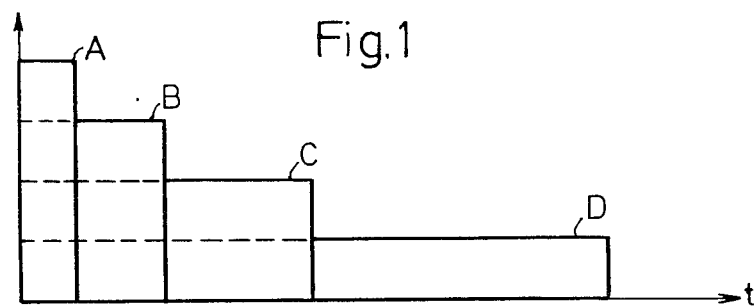
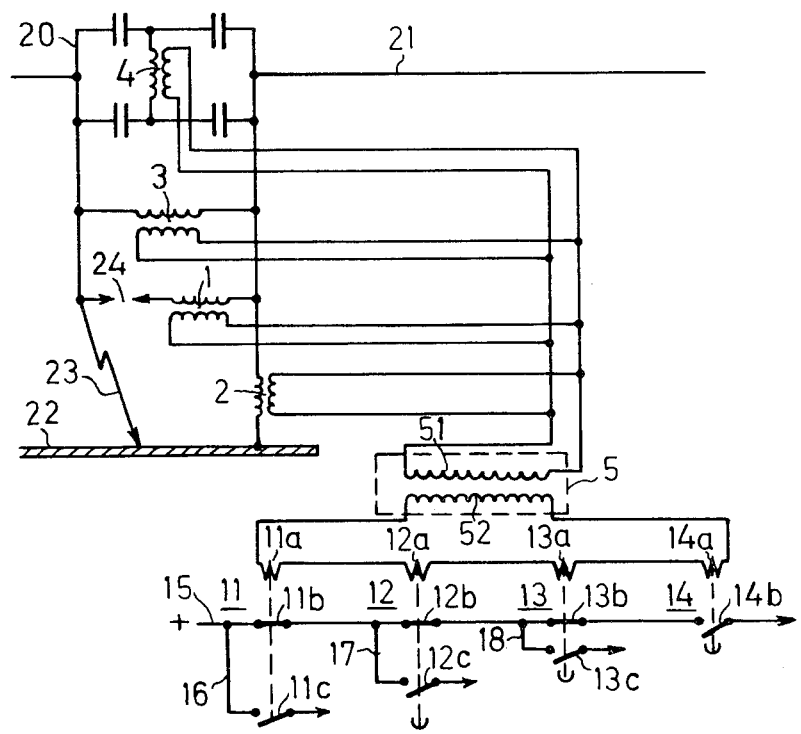

RELAY PROTECTION FOR CAPACITOR BANKS

BACKGROUND OF THE INVENTION

1. Field of the Invention

The present invention relates to a relay protection device for capacitor banks and preferably such capacitor banks as are used for series compensation in high voltage alternating networks.

2. Prior Art

In capacitor banks of the above-mentioned type there may occur disturbances of various kinds, such as unbalance voltages within the capacitor bank, overload on the network to which the capacitor is connected, flashover in a protective spark gap connected in parallel with the capacitor, flashover to the insulated platform on which the capacitor is placed, subharmonics, etc. For supervising such disturbances it may be economically justified to use fully insulated current transformers at voltages up to one or a few hundred kV. At successively increasing operating voltages of the AC networks, it is economically justified to use optronics for transmission of measurement values and signals from high voltage level to ground potential, but this technique of transmission is not accepted in some countries. It is considered complicated, difficult to modify and difficult to operate because of the requirements for special knowledge of the personnel who are to supervise the plant. This invention is therefore a complement to such optronics techniques in the form of an inexpensive electromagnetic link between high voltage and ground potential in capacitor banks.

SUMMARY OF THE INVENTION

According to the invention the problem of transmitting measurement values and signals from high voltage to ground potential is solved as follows: At each measuring station art high voltage there are terminals for a safety circuit, which preferably contains an auxiliary transformer the secondary winding of which is connected to the high voltage side of a fully insulated current transformer, placed at ground potential. Since the primary winding of this current transformer is at high voltage, the voltage insulation of the auxiliary transformers will be simple. The current transformer may have one or more primary windings, depending on the number of measuring stations, and it may also have one or more secondary windings. The signals transferred to the secondary winding or windings of the current transformer are taken out and separated by means of relays sensing time and signal level. This is possible since different signals occur on the secondary winding of the current transformer with different signal levels, and is achieved by dimensioning the auxiliary transformer on the platform of the capacitor and by a suitable distribution of cores and cascade connection of the windings. The principle of operation is that the signal for the shortest operating time has the highest signal level. Signals with longer operating time have lower signal levels.

BRIEF DESCRIPTION OF THE FIGURES

In the accompanying drawing

FIG. 1 shows an exemplary time-signal level plan to illustrate the principle of operation of the invention with four signals;

FIG. 2 shows a circuit diagram with four auxiliary transformers and one current transformer;

DETAIL DESCRIPTION

Figure 3:
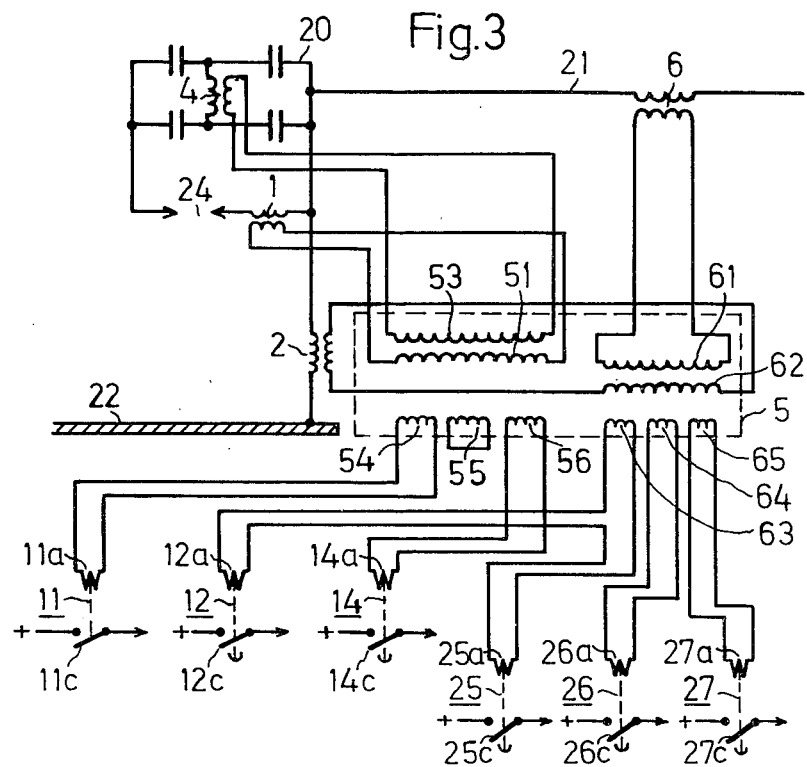
FIG. 3 shows the use of two current transformers with two primary windings and three secondary windings each.

The very basic principle of the invention will be explained with reference to FIG. 1, in which four signals A, B, C and D are shown. As will be apparent, signal A has the shortest time and the highest signal level. The signal B has a longer time but a lower signal level and in accordance with the same principle the other signals are determined, so that signal D, which has the lowest signal level, has the longest time. The time characteristic for the different signals depend partly on how quickly the disturbance causing the signal occurs, and partly on how quickly an occurring disturbance has to be remedied. A further explanation of FIG. 1 will be given in connection with the description of the other Figures.

FIG. 2 shows the invention as applied to a capacitor bank plant and using a fully insulated current transformer with one primary winding and one secondary winding. A capacitor bank 20 is shown schematically with four part capacitors in two parallel branches. An unbalance-sensing transformer 4 is connected in a known manner between the mid-points of the two branches. The secondary winding of the transformer is connected to the primary winding 51 of a fully insulated current transformer 5. Since the current transformer is fully insulated with respect to ground potential, the transformer 4 may consist of a simple auxiliary transformer. The capacitor bank 20 is connected to line 21 and is arranged on a platform 22 insulated from ground potentials. To indicate flashover between the capacitor and the platform — which flashover is marked by an arrow 23 in FIG. 1 — an auxiliary transformer 2 is connected between one end of the capacitor bank 20 and the platform 22. Also the secondary winding of auxiliary transformer 2 is connected to the primary winding of the current transformer 5. The capacitor bank 20 is protected, in a known manner, against overvoltages by means of a spark gap 24. An auxiliary transformer 1 is connected in series with spark gap 24 and the secondary winding of auxiliary transformer 1 is connected to the primary winding of current transformer 5. For indicating overload in the line 21 and thus also in the capacitor, an auxiliary transformer 3 is connected with its primary winding parallel to the capacitor bank 20. The secondary winding of the transformer 3 is connected to the primary winding of the current transformer 5. In this way all four auxiliary transformers 1, 2, 3 and 4 are connected to the primary winding 51 of the current transformer 5. To the secondary winding 52 of the current transformer 5 there are connected the windings 11a, 12a, 13a and 14a of four relays 11, 12, 13 and 14. The relay contacts 11b, 12b, 13b and 14b are connected, in series with each other, to the positive pole of a voltage source (not shown) through a line 15. Of these relay contacts, the first three are normally closed, whereas the contact 14b is opened. The relay 11 has a second contact 11c which, by way of a line 16, is connected to the line 15. In the same way the relay 12 has a second contact 12c which is connected, through the line 17, to the line 15, and the relay 13 has a second contact 13c which is connected to the line 15 through the line 18. These three last-mentioned contacts are normally opened. All the safety circuits thus include one auxiliary transformer.

The auxiliary transformer 1 is dimensioned so that, if a flashover occurs in the spark gap 24, the current transformer 5 will be supplied with a signal with a high level corresponding to signal A in FIG. 1. The relay 11 which is working without delay is energized instantaneously, opens the contact 11b and thus breaks the line 15 to the other relay contacts in this line and also closes the contact 11c, a signal circuit to a signal device (not shown) thus being broken. The relays 12, 13 and 14 have delayed operation, which means that they may be energized later on if the fault, with flashover in the spark gap 24 should remain. An operation of any of the relays 12, 13 and 14, however, does not lead to any action since contact 11b is open and the current supply through line 15 is broken.

The auxiliary transformer 2 is dimensioned so that, in case of a flashover between the capacitor and the platform 22, the level of the signal B transmitted to the current transformer 5 becomes so low that the relay 11 is not energized. The relay 12 has the shortest operation delay of the three relays 12, 13 and 14 and is thus energized first, contact 12b in the line 15 being opened and contact 12c being closed, so that a signal circuit is closed. Because the contact 12b has been opened, it is if no importance of the relays 13 and 14 should be energized later on.

The course of action described above is repeated regarding the relay 13 in the event that an overvoltage occurring across the capacitor causes a signal C from the auxiliary transformer 3. This signal has such a low level that relays 11 and 12 are not affected. Relay 14 has a longer operation delay than relay 13 and is therefore blocked when contact 13b is opened.

An unbalance within the capacitor normally appears rather slowly. The auxiliary transformer 4 is therefore dimensioned to emit a signal D with a low level. Consequently, the relays 11, 12 and 13 remain unaffected by such signals. A signal indicating unbalance within the capacitor will therefore be emitted when relay 14 is energized.

FIG. 3 shows another embodiment of the invention wherein fully insulated current transformer 5 is constructed with two core systems, each comprising a first and a second primary winding and three secondary windings. In the first system the primary winding 51 is connected to the auxiliary transformer 1 and the primary winding 53 is connected to the auxiliary transformer 4. In the second system the primary winding 61 is connected to a line current transformer 6 connected into the line 21, and the primary winding 62 is connected to the auxiliary transformer 2. The secondary winding 54 in the first system is connected to relay 11 for indicating flashover in the spark gap 24. The winding 55 is shown short-circuited and the winding 56 is connected to the winding 14a in relay 14 for indicating unbalance within the capacitor. Of the secondary windings in the second system the winding 63 is connected both to relay 12 for indicating signals from the auxiliary transformer 2 and to relay 25 for indicating overload in the line 21. The winding 64 is connected to relay 26 for indicating subharmonics occurring in the line 21. The third secondary winding 65 is connected to rely 27, which is used for control of the apparatus for reinsertion of the line. Also in this case the relays are coordinated, in the same way as shown in FIG. 2, so that a relay with shorter operation delay blocks relays with longer operations delay.

Figure 4:
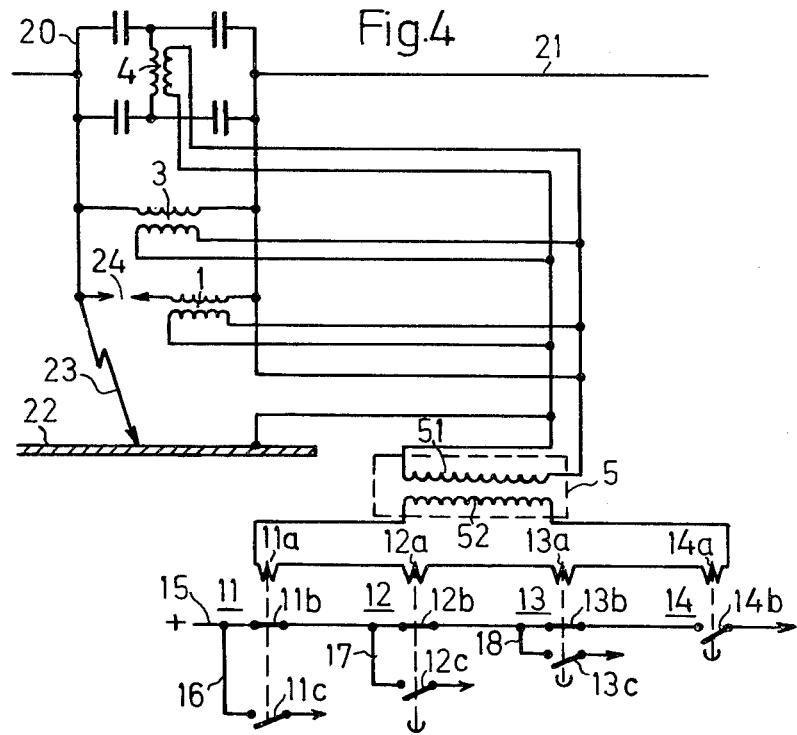
FIG. 4, shows a modification of the embodiment of FIG. 2

FIG. 4 shows a modification of the connection shown in FIG. 2, wherein the auxiliary transformer 2 has been omitted, and to the terminals between which the auxiliary transformer was connected the primary winding 51 of the current transformer 5 is now connected. The disturbance which occurs in case of a flashover between the capacitor bank 20 and the platform 22 will therefore be conducted directly to the current transformer, and in this way the use of an auxiliary transformer is dispensed with. Such a simplification is possible, partly because flashovers between capacitor 20 and platform 22 are very rare, partly because it is possible with the help of the other auxiliary transformers to obtain a sufficiently selective separation of the different error signals.

The invention can be applied both to current transformers that have cores with windings arranged on the top of an insulating stand and to transformers which have cores with windings arranged in a tank at the lower part of the transformer.

We claim:

1. Relay protection device for a capacitor bank having at least three measuring stations at a high voltage level for sensing a corresponding number of different disturbances associated with the capacitor bank, comprising:
  an auxiliary transformer for each of said measuring stations, each having a primary and a secondary winding, a primary winding of a respective auxiliary transformer being connected to a respective measuring station, each of said auxiliary transformers generating signals at the secondary winding thereof, the duration and level output of said signals being such that the signal with the highest level has the shortest duration and the signal with the lowest level has the longest duration, the remaining signals having durations and signal levels determined in a corresponding manner;
  an electrically insulated current transformer at ground potential including at least one primary winding connected to said auxiliary transformer secondary windings and further including at least one secondary winding for generating output signals representative of said disturbances;
  a sensing relay for each of said measuring stations being connected to the secondary winding of said current transformer, each relay having a respective tripping time whereby that sensing relay having the shortest tripping time is responsive to the output signal having the highest signal level, that sensing relay having the longest tripping time is responsive to the output signal having the lowest level, and the remaining sensing relays are responsive to respective other of said output signals in a corresponding manner.

2. A relay protection device as in claim 1 wherein said number of sensing relays are connected in series successively in descending order from the fastest to the slowest tripping times.

3. A relay protection device as in claim 1 wherein said capacitor bank includes a spark gap and is mounted on a platform and includes measuring stations for respectively determining flash-over between said capacitor and platform, overvoltages across said spark gap, overload across said capacitor bank and unbalance voltages within said capacitor bank.

4. A relay protection device as in claim 3 wherein said current transformer includes one primary and one secondary winding, a primary winding and a secondary winding of a respective auxiliary transformer being connected to a respective measuring station and said current transformer primary winding, respectively, and said current transformer secondary winding being connected to each of said number of sensing relays.

5. A relay protection device as in claim 3 wherein said current transformer includes one primary and one secondary winding and the measuring station for determining flash-over between said capacitor and platform is connected directly to said current transformer primary winding, a primary winding and a secondary winding of a respective auxiliary transformer being respectively connected to a respective other one of said measuring stations, and said current transformer secondary winding being connected to each of said number of sensing relays.

6. A relay protection device as in claim 3 wherein said measuring station for determining overload across said capacitor bank is a line current transformer connected in the power supply line to said capacitor bank, and said current transformer includes first and second cores each having at least one primary winding and at least one secondary winding, said at least one primary winding of each said core being connected to a respective measuring station and said sensing relays being responsive to at least one secondary winding of said cores.

7. A relay protection device as in claim 6 wherein the secondary windings of said auxiliary transformers for measuring unbalanced voltages within said capacitor and overvoltages across said spark gap are connected to respective primary windings of said first core; the secondary winding of the auxiliary transformer measuring flash-over between said capacitor bank and platform, and the secondary of said line current transformer being connected to respective primary windings of said second core; and said sensing relays being respectively responsive to respective individual secondary windings of said first and second cores.

* * * * *